US006786530B2

(12) United States Patent
Fisher

(10) Patent No.: US 6,786,530 B2
(45) Date of Patent: Sep. 7, 2004

(54) LATCHING MECHANISM FOR A VEHICLE

(75) Inventor: Sidney Edward Fisher, Redditch (GB)

(73) Assignee: ArvinMeritor Light Vehicle Systems (UK) Ltd. (GB)

( * ) Notice: Subject to any disclaimer, the term of this patent is extended or adjusted under 35 U.S.C. 154(b) by 0 days.

(21) Appl. No.: 10/313,340

(22) Filed: Dec. 6, 2002

(65) Prior Publication Data

US 2003/0111864 A1 Jun. 19, 2003

(30) Foreign Application Priority Data

Dec. 19, 2001 (GB) ............................................ 0130422

(51) Int. Cl.[7] ................................................ B60J 5/00

(52) U.S. Cl. ......................... 296/146.1; 70/257; 70/264

(58) Field of Search ........................... 296/146.1, 146.4; 70/257, 264; 340/5.72, 825.72

(56) References Cited

U.S. PATENT DOCUMENTS

| | | | | |
|---|---|---|---|---|
| 4,135,761 A | * | 1/1979 | Ward | 296/37.6 |
| 4,709,776 A | * | 12/1987 | Metz | 180/281 |
| 4,926,332 A | * | 5/1990 | Komuro et al. | 70/257 |
| 5,062,669 A | | 11/1991 | McManigal et al. | |
| 5,113,182 A | | 5/1992 | Suman et al. | |
| 5,409,277 A | * | 4/1995 | Rogers, Jr. et al. | 70/264 |
| 5,497,641 A | * | 3/1996 | Linde et al. | 70/257 |
| 5,686,899 A | * | 11/1997 | Hosmer | |
| 5,697,236 A | | 12/1997 | Kleefeldt et al. | |
| 5,755,126 A | * | 5/1998 | Lanigan et al. | 70/257 |
| 5,929,769 A | | 7/1999 | Garnault | |
| 6,091,162 A | * | 7/2000 | Williams, Jr. et al. | |
| 6,126,212 A | * | 10/2000 | Fujihara | |
| 6,367,296 B1 | * | 4/2002 | Dupont | |
| 6,557,911 B2 | * | 5/2003 | Nelsen et al. | |
| 6,655,179 B2 | * | 12/2003 | Kobayashi et al. | 70/237 |

FOREIGN PATENT DOCUMENTS

| | | | | |
|---|---|---|---|---|
| DE | 3929987 | * | 3/1991 | 296/146.4 |
| DE | 19617428 | | 11/1997 | |
| DE | 4042678 | | 10/1999 | |
| DE | 19927416 | | 1/2001 | |
| DE | 20016292 | | 12/2001 | |
| EP | 0589158 | | 3/1994 | |
| EP | 1081320 | | 3/2001 | |
| EP | 1 164 241 A2 | | 12/2001 | |
| GB | 2295293 A | | 5/1996 | |
| WO | WO 00/37755 | | 6/2000 | |

OTHER PUBLICATIONS

MG Owners Club, website, Jan. 28, 2004.*

Austin Healy Specification changes, website, Jan. 28, 2004.*

Search Report under Section 17 dated May 9, 2002.

European Search Report Dated Apr. 16, 2003.

* cited by examiner

*Primary Examiner*—Dennis H. Pedder
(74) *Attorney, Agent, or Firm*—Carlson, Gaskey & Olds

(57) ABSTRACT

A vehicle includes at least one door releasably securable in a closed position by a power operable latch. The latch is operable by a remotely operable unlatching mechanism to release the door. There is no unlatching mechanism provided on an unsecured part of the vehicle when the vehicle has been secured.

15 Claims, 5 Drawing Sheets

LATCHING MECHANISM FOR A VEHICLE

CROSS REFERENCE TO RELATED APPLICATIONS

This application claims priority to Great Britain Patent Application GB 0130422.9 filed on 19 Dec. 2001.

BACKGROUND OF THE INVENTION

The present invention relates to vehicles, and in particular vehicles including latches operable to releasably secure an associated door in a closed position.

Known vechicles include latch assemblies mounted on vehicle passenger doors for releasably retaining the door in a closed position. In order to open the door, two distinct functions have to be performed. First, the latch has to release the striker. Second, the door has to be moved from its closed position to its open position.

Typically, a door may include an outside unlatching/opening handle which is utilized to perform these two functions. Thus, the handle can be lifted or pivoted relative to the door in order to unlatch the latch and then the same handle is pulled (whilst in its lifted position) so that the door and handle move together to an open position.

The door may also include an inside door handle, typically mounted on a forward part of the door and pulled by an index finger of a vehicle occupant. Pulling of this handle operates to unlatch the latch and then the occupant can use his elbow to push the door open.

In order to close the door from the inside, typically a rigid door pull handle is provided which is distinct from the latch operating handle.

The outside unlatching/opening handle is required to be mechanically connected to the latch in order for it to perform correctly. Furthermore, it has to be ergonomically designed both in shape and position for it to be easily operated by a user. It also has to be designed with aesthetics of the whole vehicle in mind.

SUMMARY OF THE INVENTION

An object of the present invention is to provide an improved vehicle having fewer components and/or which is easy to manufacture.

The present invention provides a vehicle including at least one door releasably securable in a closed position by a power operable latch. The latch is operable by a remotely operable unlatching mechanism to release the door, and there is no unlatching mechanism provided on an unsecured part of the vehicle when the vehicle has been secured.

Advantageously, this provides for a vehicle which does not require any unlatching handles to be provided on the exterior of the vehicle, especially on the door. This simplifies and reduces the cost of manufacturing since no unlatching handles need be provided, and consequently no connection of an unlatching handle to the latch need be provided. Furthermore, the aesthetic design of the vehicle is no longer restricted by the need for an unlatching handle on the exterior of the vehicle.

Advantageously the present invention provides for a latch assembly of simplified design.

BRIEF DESCRIPTION OF THE DRAWINGS

The invention will now be described, by way of example only, with reference to the accompanying drawings in which.

DETAILED DESCRIPTION OF THE PREFERRED EMBODIMENT

Figure 1:
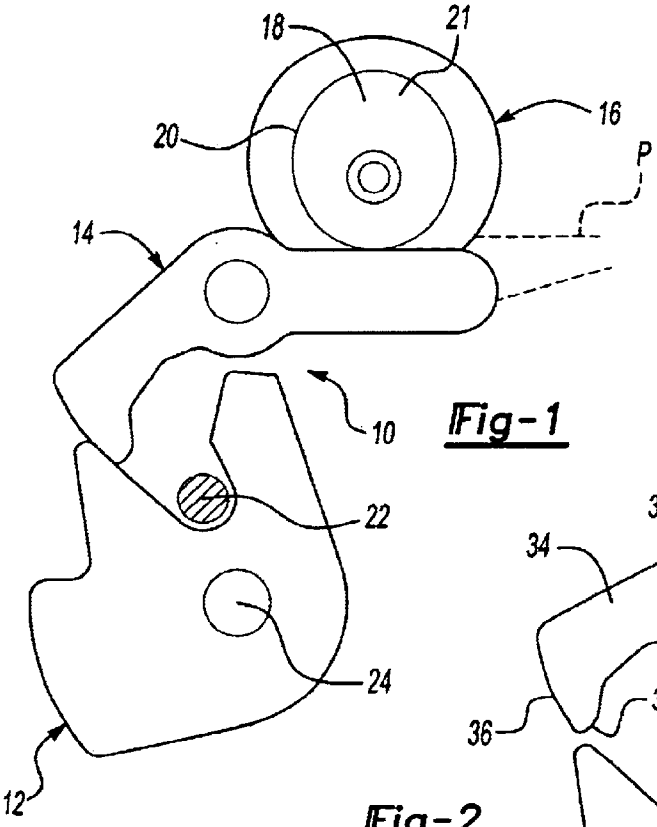
FIGS. 1 to 3 show part views of a latch assembly for use in a vehicle according to the present invention, in a latch, unlatched and open condition.
Figure 2:
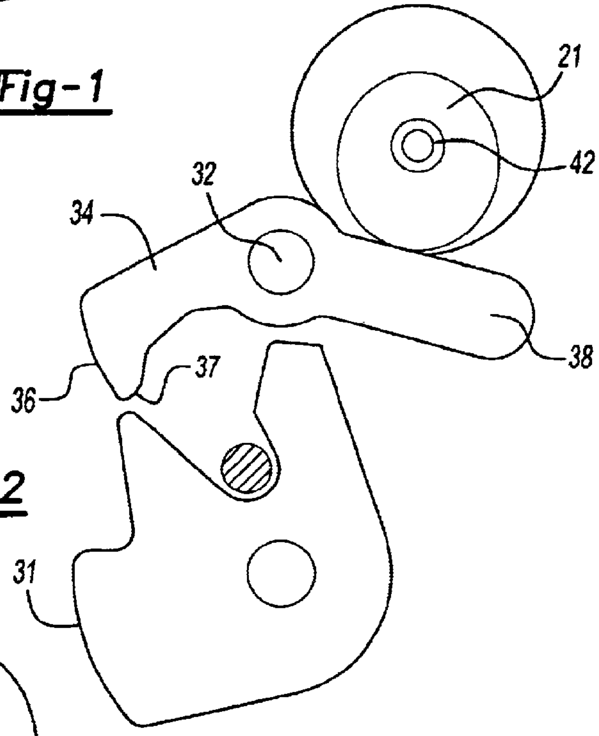
Figure 3:
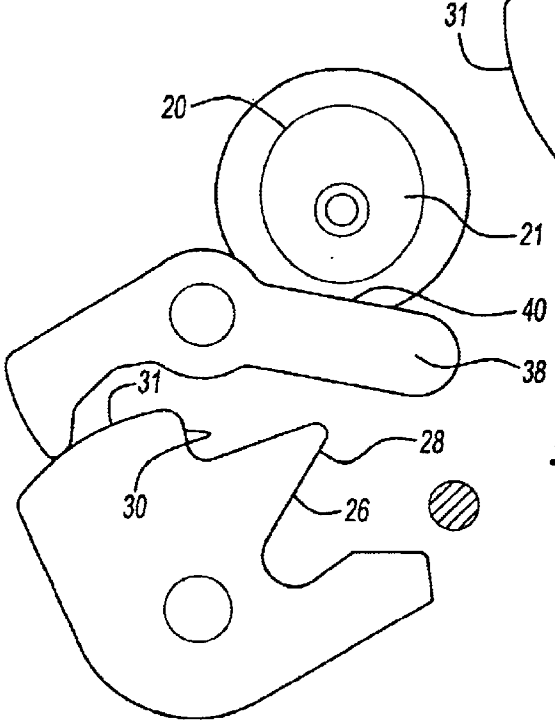

FIGS. 1 to 3 illustrate a latch assembly 10 including a latch bolt in the form of a rotating claw 12, a retention mechanism in the form of a pawl 14, an actuator in the form of an electric motor 16, and a cam 18.

The rotating claw 12 is pivotable about a claw pin 24 from a closed position, as shown in FIG. 1, to an open position, as shown in FIG. 3. The claw 12 includes a mouth 26, a closed abutment surface 28 and a first safety abutment surface 30. The pawl 14 is pivotable about a pawl pin 32 and includes a first arm 34 having a first abutment surface 36 and a second arm 38 having a second abutment surface 40. The electric motor 16 includes an output shaft 42 upon which the cam 18 is directly mounted. In this case, the cam surface 20 is circular, but since the cam 18 is mounted eccentrically relative to the output shaft 42, this arrangement provides for a single lobe cam. Operation of the latch assembly 10 is explained below.

FIG. 1 shows a striker 22 retained in the mouth 26 of the claw 12, and the claw 12 is retained in the closed position by cooperation of the closed abutment surface 28 with the first abutment 36 of the pawl 14. Under these circumstances, the door upon which the striker 22 is mounted is in a fully closed position.

It is possible for striker 22 to be retained in mouth 26 of the claw 12 whilst the first safety abutment surface 30 cooperates with the first abutment surface 36 of the pawl 14. Under such circumstances, the associated door would be in a first safety position i.e., unable to be opened, but nevertheless not in a frilly closed position.

It should be note from As shown in FIG. 1, the second abutment surface 40 of the pawl 14 is in contact with the cam surface 20 of the cam 18, but the cam lobe 21 is remote from the second abutment surface 40 of the pawl 14, thus allowing engagement between the closed abutment surface 28 of the claw 12 and the first abutment surface 36 of the pawl 14.

A pulse of current is fed to the motor 16 to continuously rotate the cam 18 through 360° and then stop.

Initial operation of the motor 16 causes the cam 18 to rotate to the position shown in FIG. 2 where the cam lobe 21 is proximal the second abutment surface 40 of the pawl 14, thus causing the pawl 14 to rotate in a clockwise direction about the pawl pin 32, disengaging the first abutment surface 36 of the pawl 14from the closed abutment surface 28 of the claw 12.

When the latch is passing through the position as shown in FIG. 2, elastometric door seals acting between the associated door and the adjacent portion of the vehicle cause the door to open such that the striker 22 moves to the right relative to the latch, causing the claw 12 to rotate in a clockwise direction with viewing FIG. 2, such that the surface 31 of the claw 12 moves to a position opposite the surface 37 of the pawl 14.

With continued rotation of the motor 16, and hence the cam surface 20, the lobe 21 achieves the position as shown in FIG. 3, i.e. remote from the second abutment surface 40 of the pawl 14 and the motor 16 stops. As shown in FIG. 3, the 4 cam surface 20 does not engage the second abutment surface 40 of the pawl 14 since these two surfaces are held apart by engagement of the surfaces 37 of pawl 14 with the surface 31 of the claw 12.

When the door is closed, the striker 22 enters the mouth 26 of the claw 12, rotating the claw 12 in a clockwise direction from the position shown in FIG. 3 to the position shown in FIG. 1, whereby the surfaces 37 and 31 disengage and allow engagement of the first abutment 36 of the pawl 14 with the closed abutment surface 28 of the claw 12.

In this case, the motor 16 is the sole means of releasing the latch under normal operating conditions. The term normal operating conditions should be construed as meaning those conditions under which an end user of the vehicle would normally open and close the associated door.

In this case, an access path P (shown schematically) is provided in order to open the latch under abnormal operating conditions. Thus, when a vehicle is being assembled on a assembly line, an independent means such as a screwdriver or other generally elongate element, can be passed through the access path P in order to operate the pawl 14 to open the latch independent of operation of the motor 16. Thus, advantageously, the door can be fitted, aligned and checked for correct opening and closing in the absence of a power source, such as the vehicle battery or a slave battery. The term access path should be construed to mean an arrangement of components that allows access of the independent means.

With reference to FIGS. 4 to 8 show part views of a further embodiment of a latch assembly 10' lot including a retention means in the form of a pawl 14' having a second arm 38' The pawl 14' is mounted similar to the pawl 14 and engages a rotating claw (not shown). The latch assembly 10' further includes a cam 18' having a cam surface 20' with a cam lobe 21'. The cam 18' is rotatable about an axis A, which is coincident with an output shaft of an electric motor (not shown). A resilient member in the form of a tension spring 44' is secured under tension between a fixing pin F mounted on a chassis of the latch assembly 10' and a connection yin C mounted on the cam 18'. The latch assembly 10' operates as described below.

Figure 4:
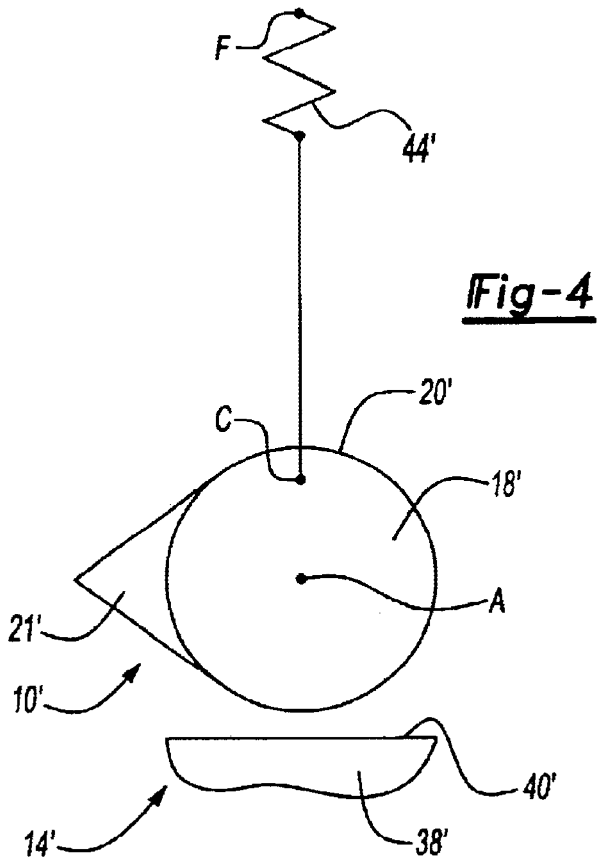
FIGS. 4 to 8 show part views of a further embodiment of a latch assembly for use in a vehicle according to the present invention when it moves from a latched condition to an unlatched condition.

FIG. 4 shows the pawl 14' in an engaged position, and in particular the cam surface 21' does not contact the second abutment surface 40' of the pawl 14'. Operation of the motor causes the cam 18' to rotate counter-clockwise through 360°. During part of this 360° movement, the cam lobe 21' engages the second abutment surface 40' of the pawl 14', causing the pawl 14' to rotate clockwise and thus allowing the latch to open (see FIG. 8).

Consideration of FIG. 4 shows that the tension spring 44' biases the cam 18' to the position shown in FIG. 4, since this is the position at which the distance between the connection pin C and the fixing pin F is a minimum. In this position, cam 18' is in a stable equilibrium position i.e., a small rotation of the cam 18' clockwise or counter-clockwise will result in the cam 18' returning to the position as shown in FIG. 4.

Figure 5:
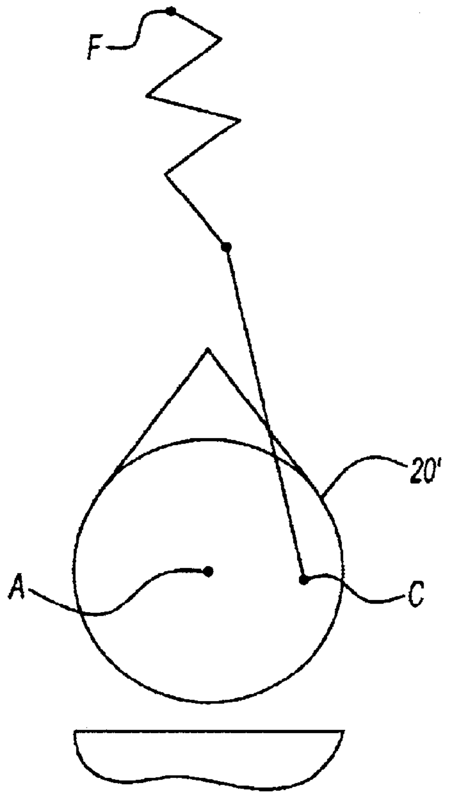

FIG. 5 shows the cam 18' having been rotated through 90° and the tension spring 44' is extended.

Figure 6:
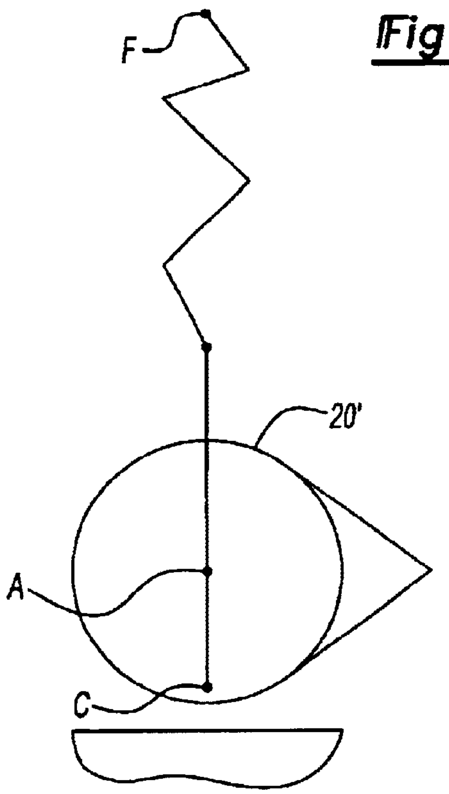

FIG. 6 show the tension spring 44' further extended when the cam 18' rotated through 180°. In this case the axis A is on a line joining the connection pin C to the fixing pin F. Although this position is being moved through transiently, the cam 18' nevertheless is momentarily in an unstable equilibrium position. Thus, should the motor fail in this position, the cam 18' would remain in this position. However, the cam 18' is slightly displaced clockwise, the spring 44 would move the cam 18' clockwise to the position as shown in FIG. 4. If the cam 18' is displaced slightly counter-clockwise, the spring 44' would move the cam 18' counter-clockwise to the position as shown in FIG. 4.

Figure 7:
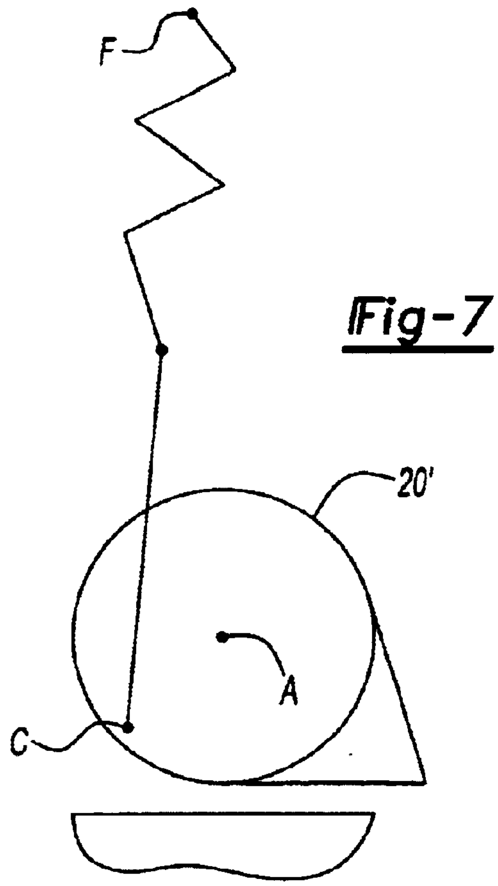

FIG. 7 shows the cam 18' moved beyond the unstable equilibrium position of FIG. 6.

Figure 8:
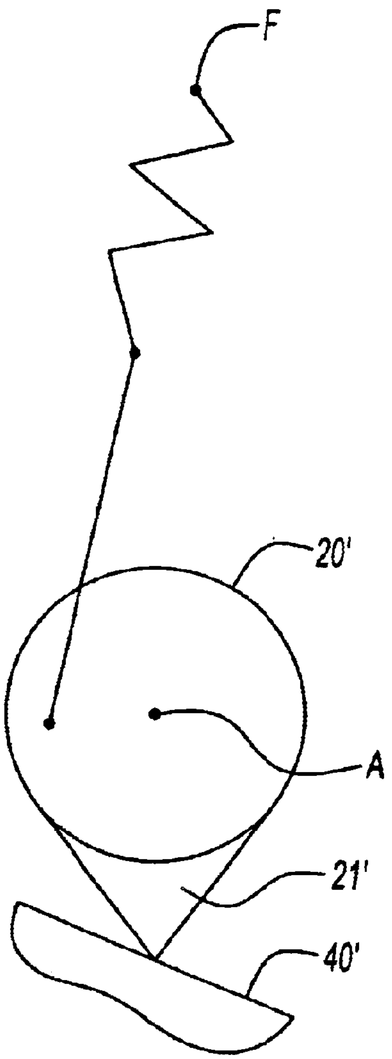

During the movement of the cam 18' from FIG. 4 to the position shown in FIG. 7, the cam surface 20' does not engage the second abutment surface 40' of the pawl 14'. Thus, it is only during the latter part of the rotation of the cam 18' that the cam lobe 21' engages the second abutment surface 40' to move the pawl 14' to a disengaged position (as shown in FIG. 8).

In particular, the tension spring 44' can be designed such that the amount of power required to move cam 18' from the position shown in FIG. 4 to the position shown in FIG. 6 is greater than the amount of power required to open the latch. Thus, under these circumstances, if the motor fails and looses power, then subsequent operation of the motor to open the door would result in the motor being unable to move the cam 18' from the position shown in FIG. 4 to the position shown in FIG. 6. Under these circumstances, the door would remain closed, which is preferred to a door that cannot be retained in a closed position.

Furthermore, the tension spring 44' can also be designed such that if the motor losses all power when the cam 18' is in the position as shown in FIG. 7, the tension spring 44' has sufficient energy stored therein to move the cam 44' from the position as shown in FIG. 7 to the position as shown in FIG. 4. Again, this results in a door that can be held in a closed position.

In further embodiments, alternative latch bolts could be used, such as non rotating, latch bolts. Furthermore, alternative retention mechanism could be used. Furthermore, alternative actuators such as pneumatic or hydraulic actuators could be used. Furthermore, the cam need not be mounted directly on the actuator output shaft. For example, a gear system could be used between the output shaft of the actuator and the cam.

Figure 9:
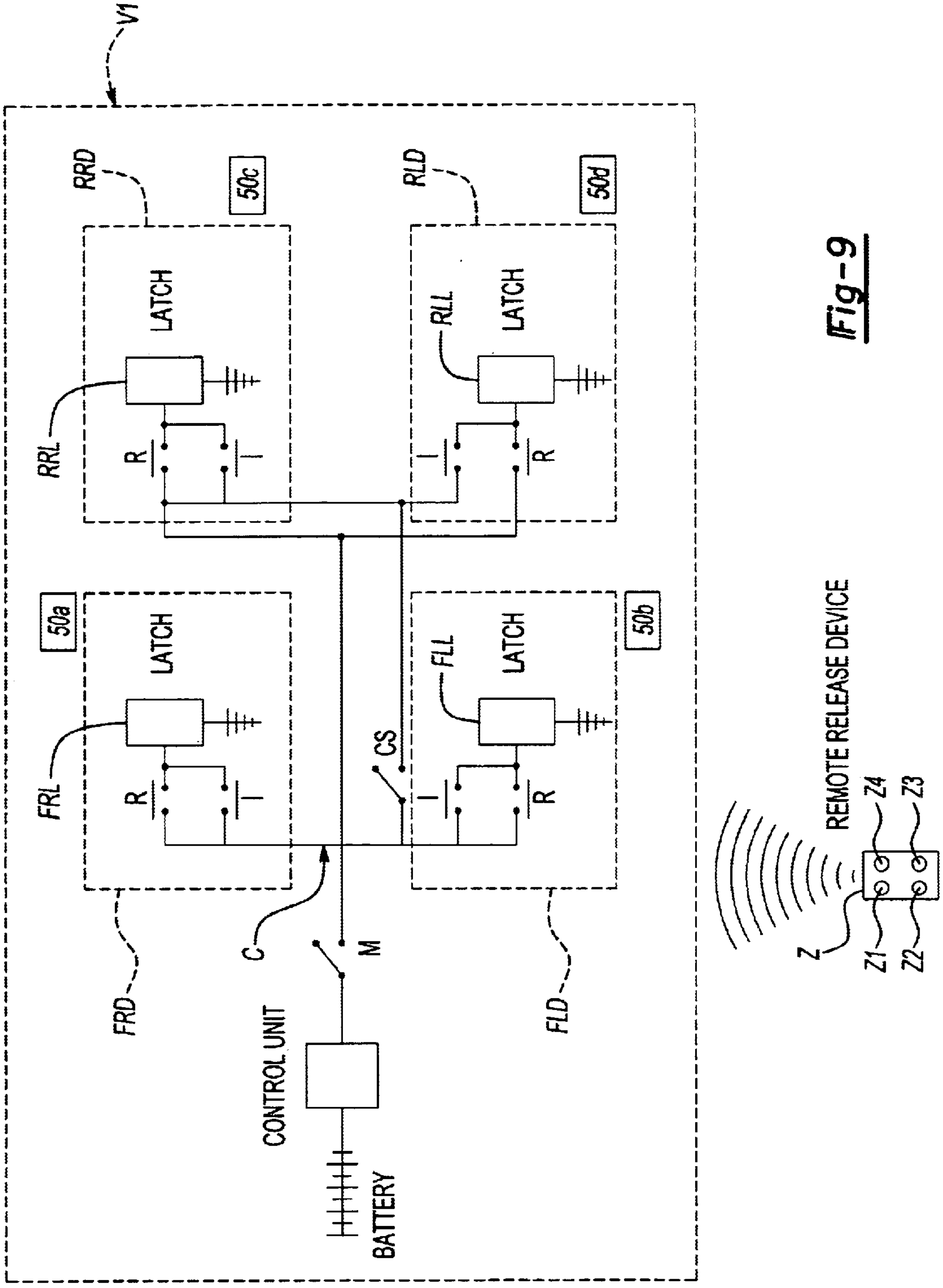
FIGS. 9 and 10 show alternate embodiments of vehicles according to the present invention.
Figure 10:
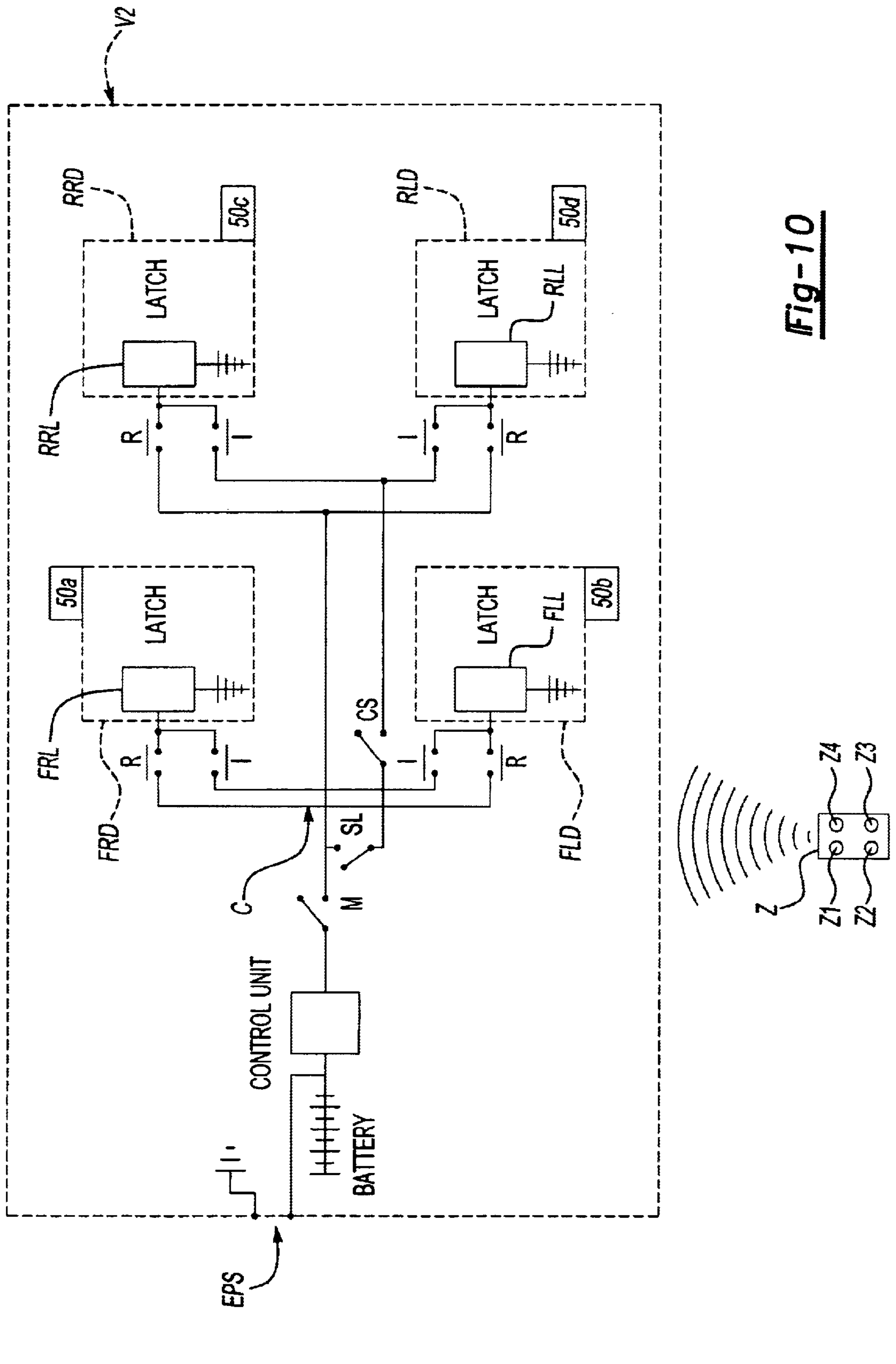

With reference to FIGS. 9 and 10, there is shown schematic views of vehicles V1 and V2 including doors FRD, FLD, RRD, and RLD having unsecured parts **50*a*, 50*b*, 50*c* and 50*d*,** respectively.

For ease of reference the following references will be used, where appropriate on FIGS. 9 and 10.

M=Motion Switch l=Inside Release Switch

R=Remote Release Switch

CS=Child Safety Switch

FRL=Front Right Latch

FLL=Front Left Latch

RRL=Rear Right Latch

RLL=Rear Left Latch

EPS=Emergency Power Socket

C=Circuit

FRD=Front Right Door

ELD=Front Left Door

RRD=Rear Right Door

RLD Rear Left Door

SL=Superlock Switch

Z=Remote Release Device

The switches fall into two classes. Thus, the remote release switch and the inside release switch are all biased to an open position with a positive action being required to close the switches.

The motion switch, child safety switch and superlocking switch are all bi-stable switches. That is, the switches have a stable open position and a stable closed position.

Consideration of FIG. 9 shows that the vehicle V1 (shown schematically) includes four passenger doors (shown schematically) FRD, FLD, RRD and RLD. Each door includes an associated latch FRL, FLL, RRL and RLL which releasably secures the appropriate door in its closed position. These latches can be either of the embodiments shown in FIGS. 1–3 or 4–8, or alternatively can be different embodiments. The latch engages a striker (such as striker 22), which is secured to a fixed structure of the vehicle. Operation of the latch will cause the latch bolt (typically a rotating claw such as claw 12) to release the striker and the door will move to an ajar position by virtue of a door seal, mounted at the periphery of the door acting to move the door to the ajar position. From the ajar position, the user of the vehicle can then manually move the door to its fully open position.

All latches on FIG. 9 are identical, apart from the position at which they are mounted on the vehicle.

Thus, the latch FRL is a power operable latch, which when powered releases the striker from the latch claw, allowing subsequent opening of the door. Power can only be fed to the latch FRL when the motion switch M is in a closed position. This occurs when the vehicle is either stationary or is moving below a predetermined speed (such as 5 kilometers per hour). Once the vehicle has exceeded the predetermined speed, the motion switch opens and it is not possible to open any of the doors. Once the vehicle has slowed and is moving below the predetermined weed or has stopped, the motion switch closes automatically.

With a vehicle is stationary and an occupant desires to exit the door FRD, a vehicle occupant can manually press the inside release switch associated with that door, This will allow power to operate the latch and hence release the door.

It should be noted that all of the inside release switches I are located on the inside of the vehicle and are not accessible to unauthorized persons (such as car thieves) when the vehicle has been secured (i.e., when all of the door have been closed and all other apertures such as windows and sun roofs have also been closed or substantially closed).

The remote release switch R can only be operated by the remote release device Z. The remote release device Z typically is a small hand held device which the vehicle driver carries with him when remote from the vehicle. It can be an active device and require an active input from the vehicle owner in order to arrange for remote release switch to close. Alternately, it can be a passive device and one or more of the remote release switches R close when the person carrying the device is within a certain range of the vehicle.

In the embodiment shown in FIG. 9, the remote release switches have been shown positioned on their appropriate doors. However, in further embodiments, the remote release switches need not be positioned on their appropriate doors and typically might be positioned inside the control unit (with appropriate circuitry) to ensure the switch is topologically in the same position in the circuit C.

Furthermore, a child safety switch (CS) is provided (shown in an open position) to provide for a child safety feature on the rear doors. With the child safety switch shown in the position as shown in FIG. 9, the rear doors will not open when their appropriate inside release switches are manually operated. Child safety switch can be opened or closed at the drivers option depending upon the age of any rear seat occupants of the vehicle.

In particular, it should be noted that there is no outside release switch on the vehicle, i.e. no switch mounted on the outside of the vehicle which can be operated to open any latch. However, the vehicle may include a fixed door pull handle, the sole function of which is to swing the door from an ajar position to an open position. In particular, it should be emphasized that such a handle does not operate to unlatch the latch. Because of this, the vehicle automatically goes into a locked state when the doors are shut since there is no mechanism of opening the doors mounted on the outside of the vehicle. This can be contrasted known vehicles which have externally mounted latch release handles. On such known vehicles, even with all the doors shut, the vehicle may not be locked, since in order to lock the vehicle the externally mounted latch release handles must additionally be disabled. It can be seen that no such additional disablement is required on the present invention simply because no such external mounted latch release handles are provided. None of the unsecured parts *50a*, *50b*, *50c* and *50d* of the vehicle have a latch.

The remote release device Z can take many forms. In one example, it is an active system having four push buttons Z1, Z2, Z3 and Z4. Each push button is associated with an appropriate door. Pressing one of the buttons on the remote release device will release one door. To open all four doors using just the remote release device, all four buttons have to be pushed. Alternately, a single button on a remote release device can be associated with a set of doors and a further push button being associated with a different set of doors. On a remote release device having two buttons, the first button can be pressed to open the front doors and the second button can be pressed to open the rear doors. Alternatively, the first button can be pushed to open the drivers door and the second button can be pushed to open the front passenger door and the rear doors. Alternatively, the first button can be pushed to open the drivers door and the second button is pushed to open all the doors (including drivers door). Alternatively, the remote release device can have just one button which when operated in a specific fashion could open different sets of doors. Thus, pressing the button once could open the drivers door and pressing the button twice in quick succession could open all the doors.

Consideration off FIG. 10 shows a vehicle V2 identical to the vehicle V1 except that the vehicle V2 includes a superlock switch SL. The switch SL is in series with all inside release switches I. When the superlock switch SL is in the open position, the inside release switches I will not unlatch the latch and the doors will remain closed. This can prevent a thief who has gained access from opening the doors.

Additionally, it should be noted that in this case the remote release switches R and the inside release switches I are no longer mounted on their appropriate doors. The inside release switches I can be mounted at any convenient location which is readily accessible to a person sitting in the vehicle adjacent to the appropriate door. Thus, the switches can be mounted on fixed bodywork of the vehicle, or a central console.

Furthermore, the vehicle includes an emergency power socket EPS to which an external power source such as a battery can be connected when the vehicle battery has gone flat.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

What is claimed is:

1. A vehicle comprising:

at least one of a passenger door and a driver door releasably securable in a closed position by a power operable latch, the latch being operable by a remote device to release the at least one of the passenger door and the driver door; and wherein the power operable latch is a latch assembly including a latch bolt, a retaining mechanism and an actuator, the latch bolt being moveable between a closed position at which the latch bolt is capable of retaining a striker and an open position at which the striker is released, the retaining mechanism being moveable between a retained position at which the retaining mechanism retains the latch bolt in at least the closed position and a released position at which the latch bolt is moveable between the open position and closed position, wherein the latch bolt automatically moves from the open position to the closed position upon closing of the at least one of a passenger door and a driver door to automatically lock the at least one of a passenger door and a driver door, and the actuator being capable of moving the retaining mechanism from the retained position to the released position, and wherein only the actuator releases the latch under normal operating conditions.

2. The vehicle as defined in claim 1 further including a second unlatching mechanism provided on a secured part of the vehicle when the vehicle has been secured.

3. The vehicle as defined in claim 2 further including a disabling mechanism to prevent the second unlatching mechanism from operating the latch to release the door.

4. The vehicle as defined in claim 3 wherein the disabling mechanism prevents the second unlatching mechanism from operating the latch when the vehicle is moving above a predetermined speed.

5. The vehicle as defined in claim 3 wherein the disabling mechanism operates to prevent the second unlatching mechanism from operating the at least one of the passenger door and the driver door when the vehicle is stationary.

6. The vehicle as defined in claim 3 further including a plurality of doors, each door having an associated second unlatching mechanism, wherein the disabling mechanism acts to prevent at least one of the associated second unlatching mechanism from unlatching an associated door.

7. The vehicle as defined in claim 1 further including a plurality of doors wherein the remote device is operated to independently release a first set of doors and a second set of doors, and the first set of doors is different from the second set of doors.

8. The vehicle as defined in claim 7 wherein the first set of doors is a single door and the second set of doors is a single different door.

9. The vehicle as defined in claim 7 wherein the first set of doors is a driver's door and a second set of doors is a remainder of said door of the vehicle.

10. The vehicle as defined in claim 7 wherein the first set of doors is two front doors and a second set of doors is a remainder of said doors of the vehicle.

11. The vehicle as defined in claim 1 wherein the at least one of the passenger door and the driver door is a passenger door.

12. A vehicle comprising:

at least one of a passenger door and a driver door releasably securable in a closed position by a power operable latch, the latch being operable by a remote device to release the at least one of the passenger door and the driver door; and wherein the power operable latch is a latch assembly including a latch bolt, a retaining mechanism, an actuator and a cam having a cam surface, the latch bolt being moveable between a closed position at which the latch bolt is capable of retaining a striker and an open position at which the striker is released, the retaining mechanism being moveable between a retained position at which the retaining mechanism retains the latch bolt in at least its closed position and a released position at which the latch bolt can move between the closed position and the open position, wherein the latch bolt automatically moves from the open position to the closed position upon closing of the at least one of a passenger door and a driver door to automatically lock the at least one of a passenger door and a driver door, and the retaining mechanism further including an actuation abutment, the actuator being operable to move the cam, the cam surface engaging the actuation abutment of the retaining mechanism to move the retaining mechanism to the released position.

13. A vehicle comprising:

at least one of a passenger door and a driver door releasably securable in a closed position by a power operable latch, the latch being operable by a remote device to release the at least one of the passenger door and the driver door; and wherein the power operable latch is a latch assembly including a latch bolt, a retaining mechanism and an actuator, the latch bolt being moveable between a closed position at which the latch bolt is capable of retaining a striker and an open position at which the striker is released, the retaining mechanism being moveable between a retained position at which the retaining mechanism retains the latch bolt in at least the closed position and a released position at which the latch bolt can move between the open and closed position, the actuator being capable of moving the retaining mechanism from the retained position to the released position, wherein the latch bolt automatically moves from the open position to the closed position upon closing of the at least one of a passenger door and a driver door to automatically lock the at least one of a passenger door and a driver door, and wherein the actuator is biased towards an at rest position, and wherein the retaining mechanism is capable of achieving one retained position by a resilient member.

14. The vehicle as defined in claim 1 further including a plurality of power operable latches, and at least two of said plurality of power operable latches are identical.

15. A vehicle comprising:

at least one of a passenger door and a driver door releasably securable in a closed position by a power operable latch, the latch being operable by a remote device to release the at least one of the passenger door and the driver door;

wherein the power operable latch is a latch assembly including a latch bolt, a retaining mechanism and an actuator, the latch bolt being moveable between a closed position at which the latch bolt is capable of retaining a striker and an open position at which the striker is released, the retaining mechanism being moveable between a retained position at which the retaining mechanism retains the latch bolt in at least the closed position and a released position at which the latch bolt is moveable between the open position and closed position, wherein the latch bolt automatically moves from the open position to the closed position upon closing of the at least one of a passenger door and a driver door to automatically lock the at least one of a passenger door and a driver door, and the actuator being capable of moving the retaining mechanism from the retained position to the released position; and wherein the latch is released from outside the vehicle by the remote device.

* * * * *

UNITED STATES PATENT AND TRADEMARK OFFICE

CERTIFICATE OF CORRECTION

PATENT NO. : 6,786,530 B2
DATED : September 7, 2004
INVENTOR(S) : Fisher

It is certified that error appears in the above-identified patent and that said Letters Patent is hereby corrected as shown below:

Column 7,
Line 61, "door" should read as -- doors --.

Signed and Sealed this

Fourteenth Day of December, 2004

JON W. DUDAS
*Director of the United States Patent and Trademark Office*